United States Patent

Shibuya et al.

[15] 3,671,761

[45] June 20, 1972

[54] SINGLE PULSE GENERATING CIRCUIT

[72] Inventors: Koji Shibuya; Teruhi Takano, both of Tokyo, Japan

[73] Assignee: Nippon Electric Co., Ltd., Tokyo, Japan

[22] Filed: Jan. 21, 1971

[21] Appl. No.: 108,287

[30] Foreign Application Priority Data

Jan. 22, 1970 Japan....................................45/6996

[52] U.S. Cl.........................................307/106, 317/148.5 B

[51] Int. Cl.........................................................H01h 47/32

[58] Field of Search...................307/106, 108; 317/148.5 B, 317/DIG. 6, 151

[56] References Cited

UNITED STATES PATENTS 3,558,995 1/1971 Swinehart....................317/148.5 B X

*Primary Examiner*—Robert K. Schaefer

*Assistant Examiner*—William J. Smith

*Attorney*—Sandoe, Hopgood & Calimafde

[57] ABSTRACT

Electronic switching apparatus employs oppositely poled, shunt connected thyristors selectively activated for energizing a load during only a single half cycle of an applied alternating current waveform. A stabilizing circuit is provided to suppress subsequent, repetitive thyristor conduction intervals which otherwise occur when the load exhibits a significant inductive reactance component.

3 Claims, 6 Drawing Figures

INVENTORS
KOJI SHIBUYA
TERUHI TAKANO
BY
Sandoe, Hopgood & Calimafde
ATTORNEYS

INVENTORS
KOJI SHIBUYA
BY TERUHI TAKANO

Sandoe, Hopgood & Calimafde
ATTORNEYS

INVENTORS
KOJI SHIBUYA
BY TERUHI TAKANO
Sandoe, Hopgood & Calimafde
ATTORNEYS

SINGLE PULSE GENERATING CIRCUIT

DISCLOSURE OF INVENTION

This invention relates to electronic control circuits and more specifically to a pulse generating circuit for supplying a current corresponding to substantially a single half cycle of an alternating current power main to a load responsive to switch actuation.

A circuit which generates a single current pulse in response to a switch being activated has heretofore been widely used as a drive power source for solenoid actuated apparatus which provide for single striking action, e.g., an electromagnetic tacker and the like. However, prior art circuits used for such purposes as above stated could not generate a single current pulse when the inductive component of the driven load becomes large.

It is an object of the present invention to provide a circuit which does not suffer from the above limitations, e.g., which supplies current terminating with a single pulse to a load irrespective of the properties of the load.

To achieve the foregoing and other objects, and in accordance with the present invention, a charging capacitor is employed in the gate circuit of one of two thyristors connected in reverse polarity in parallel one with another and in series with a load. The capacitor is connected in parallel with a stabilizing circuit including another thyristor. The electric charge of the charging capacitor is made sufficiently small such that the capacitor does not cause a thyristor connected therewith to continue to fire over more than one half cycle of a power source.

The above and other objects, features and advantages of the present invention are realized in illustrative embodiments thereof, discussed in detail herein below, in which.

Figure 1:
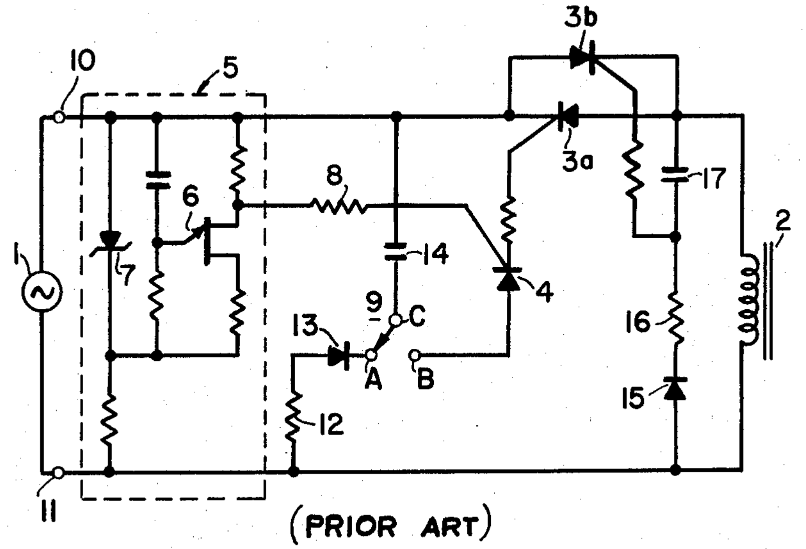
(PRIOR ART) FIG. 1
FIG. 1 is a circuit diagram depicting a prior art pulse generating circuit.

Before treating the present invention with reference to the drawings, reference will first be made to FIG. 1 showing a conventional, well known circuit. In FIG. 1, an A.C. power source 1, a load 2, and reversely parallel connected thyristors 3*a* and 3*b* are connected in series across the power source 1. An A.C. source-synchronized pulse generating circuit 5, surrounded by dashed lines, includes a unijunction transistor 6, a Zener diode 7, and so forth, and generates a synchronized pulse when the polarity of the A.C. power source 1 voltage applied at a source terminal 11 is positive with respect to a source terminal 10. This pulse output is applied to a gate of a thyristor 4 through a resistor 8, a cathode of this thyristor 4 being connected to a gate circuit of the thyristor 3*a*. The anode of thyristor 4 is connected to a contact B of a drive switch 9. To the other, contact A-side of the switch 9, a series circuit formed of a resistor 12 and a diode 13 is connected from the source terminal 11 of the power source 1. A capacitor 14 is connected between a movable arm terminal C of the switch 9 and the terminal 10 of the power source 1, and arranged to be charged up to the peak voltage of the power source 1 through the diode 13 if the switch 9 is positioned on A-side.

When the switch 9 is moved to engage the terminal B, the voltage of the charged capacitor 14 is applied to the anode of the thyristor 4, and the thyristor 4 begins to conduct at a phased moment corresponding to the occurrence of the first pulse of the synchronizing pulse sequence after actuation of the switch 9, thereby causing a gate current to flow through the thyristor 3*a*. In this circuit state, by reason of the firing of the thyristor 3*a*, and in addition to the current which flows through the load 2, charging current flows through a capacitor 17 by way of a series circuit connected in parallel with the load 2 comprising a diode 15, a resistor 16 and the capacitor 17.

Further, a current flows in a gate circuit of the thyristor 3*b* connected in parallel with the capacitor 17. The current passing through the gate circuit of the thyristor 3*b* flows continuously due to discharging of the electric charge of the capacitor 17. This gate current persists when the source terminal 10 becomes positive after polarity reversal of the power source 1 and, accordingly, the thyristor 3*b* fires. A current therefore flows through the load 2 for only an interval from the moment when the above considered pulse is first applied from the source pulse generating circuit 5 to the gate of the thyristor 4 after the switch 9 is moved to its B-side, until the next positive half cycle at the source terminal 10 terminates.

Figure 4:
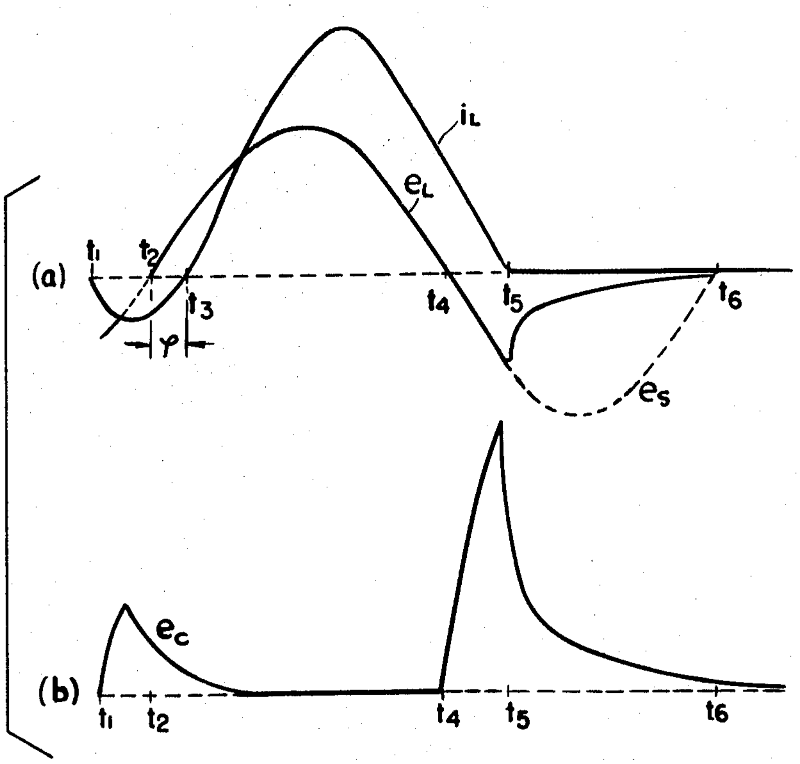
FIGS. 4(*a*), 4(*b*), 5 and 6 are voltage and current wave form diagrams for presenting the operational principles of the present invention.
Figure 5:
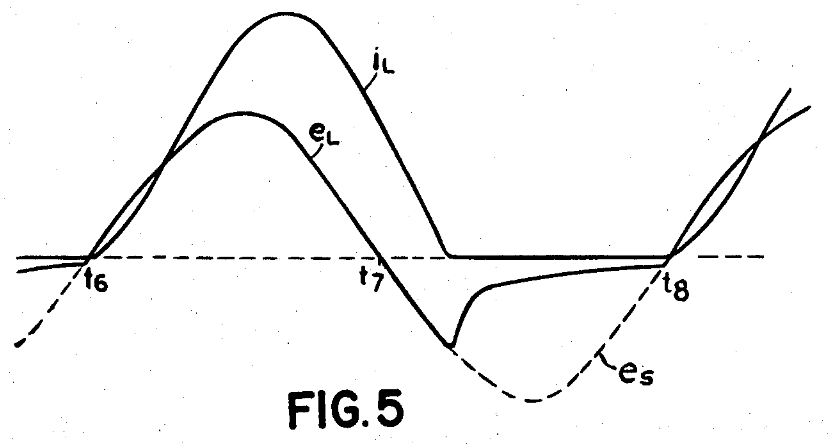

However, in the foregoing circuit functioning, if the load 2 is inductive and, particularly, if its inductance is large, conduction does not end with a single operation. To the contrary, the thyristor 3*b* continues its conduction every half cycle when the source terminal 10 becomes positive. That is, as shown in FIG. 4(*a*), the thyristor 3*a* conducts at time $t_1$ and thereafter the thyristor 3*b* conducts also. A load voltage such as $e_L$ in FIG. 4(*a*) is thus supplied to the load 2, and, at the same time, due to its inductive component, a load current $i_L$ having a phase lag of $\phi = t_3 - t_2$ flows. At time $t_4$ when the source voltage $e_S$, and thus the load voltage $e_L$ in phase therewith, becomes zero, the anode current of the thyristor 3*b* becomes zero. However, at this time, the load current $i_L$ is not zero due to a phase lagging and flows into the capacitor 17 to charge this capacitor as shown in FIG. 4(*b*). If the inductance of the load 2 is large, this charging energy is also large. Thus, the capacitor 17 is charged to such a degree that the stored voltage $e_C$ of the capacitor 17 is retained up to a time $t_6$ when the source terminal 10 of the power source 1 again becomes positive. Consequently, the thyristor 3*b* last turned off is fired again and, in this manner, conduction for the thyristor 3*b* is repetitive. Accordingly, current $i_L$ of a wave form shown in FIG. 5 continues to flow until the power source 1 is cut off.

Figure 2:
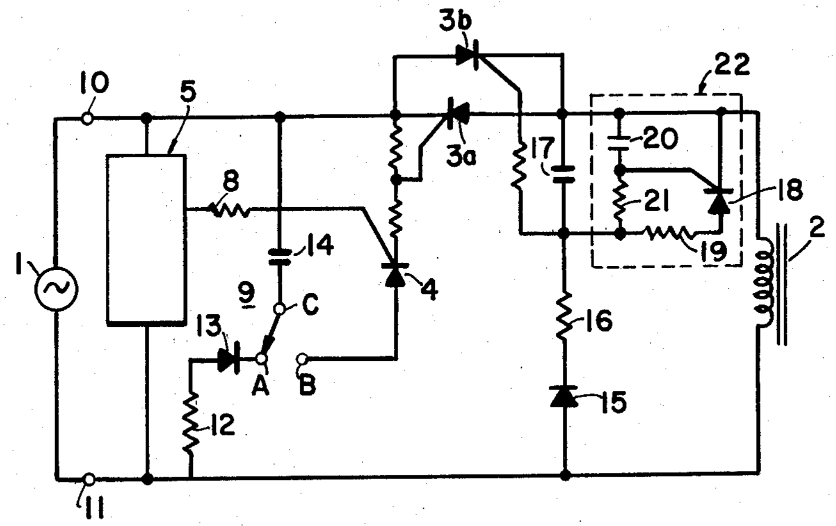
FIGS. 2 and 3 are circuit diagrams depicting embodiments in accordance with the principles of the present invention.

Referring now to FIG. 2, there is shown an embodiment of the present invention. This structure includes a stabilizing circuit 22, shown as surrounded by dashed lines, which is connected to the capacitor 17 in parallel with the gate circuit of the thyristor 3*b* of the prior art circuit shown in FIG. 1. In this stabilizing circuit, a series circuit formed of a thyristor 18 and a resistor 19 is connected in parallel with another series circuit comprising a capacitor 20 and a resistor 21. A terminal voltage of the capacitor 20 is applied to a gate terminal of the thyristor 18.

The stabilizing circuit 22 operates in the following manner. At the time $t_4$ in FIG. 4(*b*), the source voltage $e_S$ becomes zero and the anode current of the thyristor 3*b* similarly becomes zero. However, a charging current flows into the capacitor 17 due to inductance of the load 2 and accordingly, the terminal voltage $e_C$ of the capacitor 17 begins to rise in the manner as shown in FIG. 4(*b*) associated with the circuit of FIG. 1. Simultaneously with the rising terminal voltage of the capacitor 17, the terminal voltage of the capacitor 20 in the stabilizing circuit 22 also rises. The thyristor 18 therefore fires at moment $t_{5a}$ shown in FIG. 6(*a*), discharging the electric charge of the capacitor 17 lowering its terminal voltage. Although the terminal voltage of the capacitor 17 thereafter continues to rise by action of stored energy from the load inductance, this rising force is weak. Thus as the stored energy of the inductance of the load 2 subsequently decays, charging of the capacitor 17 terminates, and the stored capacitor voltage becomes discharged. Before the next cycle when the source terminal 10 is again positive, the terminal voltage $e_C$ of the capacitor 17 is lowered to an amplitude insufficient to fire the thyristor 3*b*. It is therefore possible to prevent continuous conduction which would otherwise occur if the stabilizing circuit 22 were not employed.

Figure 3:
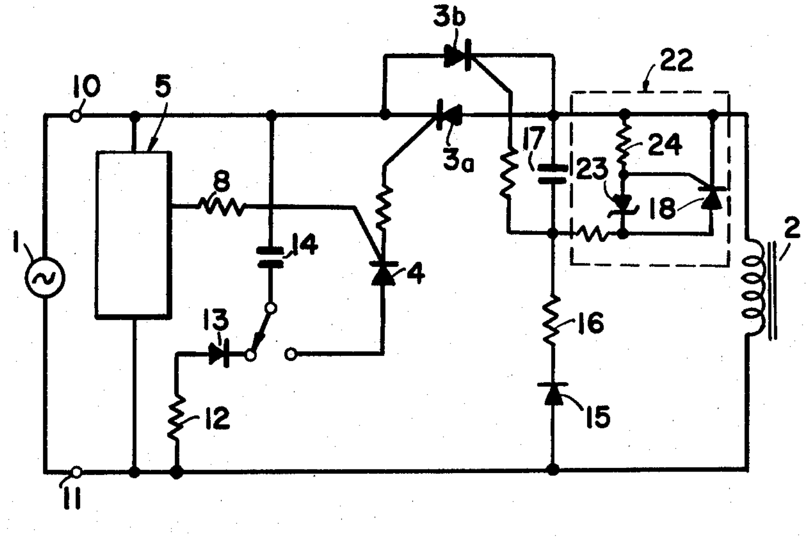

FIG. 3 depicts another embodiment of the present invention in which, in place of the series circuit of FIG. 2 comprising the capacitor 20 and the resistor 21 in the stabilizing circuit 22, a series circuit formed of Zener diode 23 and a resistor 24 is connected between the anode and cathode of the thyristor 18.

Figure 6:
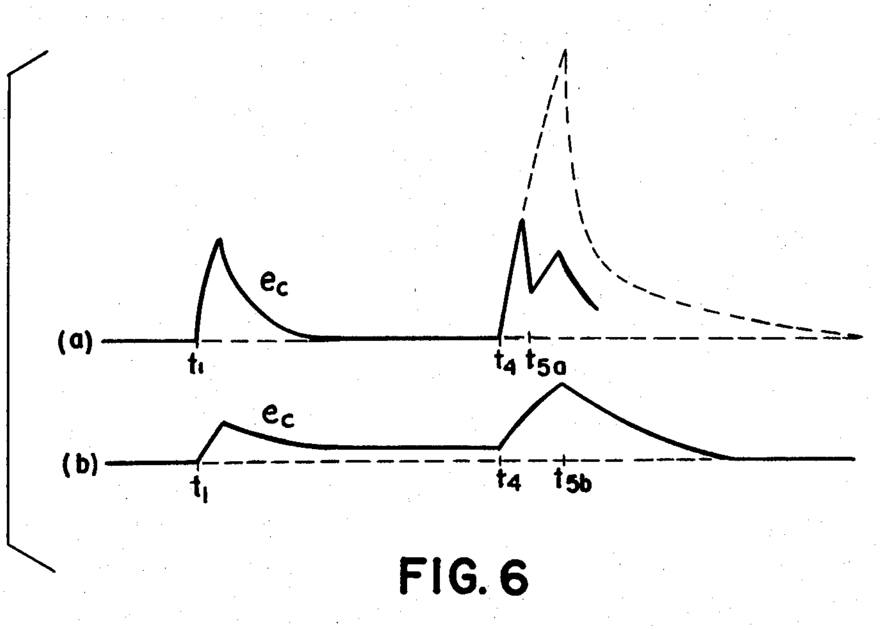

The terminal voltage of the resistor 24 is applied to the gate of the thyristor 18. According to this construction, as shown in FIG. 6(*b*), at moment $t_{5b}$ when the rising terminal voltage $e_C$ of the capacitor 17 exceeds the breakdown voltage of the Zener diode 23, the thyristor 18 fires to thereby suppress the increase in terminal voltage for the capacitor 17. The capacitor 17 is thus discharged before a next cycle starts.

As described hereinabove, in accordance with the present invention, structure is provided to prevent the thyristor from firing during a succeeding cycle, and for discharging the electric charge of the capacitor connected in the gate circuit of that thyristor quickly after the thyristor 3*b* has fired, accordingly, continuous conduction is prevented, and it is possible to supply a predetermined single current pulse to the load. Therefore, when the present configuration is employed for driving electric circuits such as solenoid apparatus, continuous operation during succeeding cycles is prevented to thereby provide reliable and secure striking operation.

The above described arrangements are merely illustrations of the principles of the present invention. Numerous modifications and adaptations thereof will be readily apparent to those skilled in the art without departing from the principles of the present invention.

What is Claimed Is:

1. A single pulse generating circuit of the type in which oppositely poled, parallel-connected thyristors are connected in series with an A.C. power source and a load, said circuit including means for firing one of said thyristors including switching means for supplying thereto the output from a synchronized pulse generator controlled by said power source and of a terminal voltage of a previously charged first capacitor, a gate electrode of the other of said thyristors being connected to one electrode of a charging second capacitor of a series circuit which includes in series said second capacitor and a diode, said series circuit being connected in parallel with said load, characterized in that said pulse generating circuit further includes a stabilizing circuit connected in parallel with said second capacitor, said stabilizing circuit including an additional thyristor for limiting the amount of electric charge stored in said second capacitor during succeeding cycles after said other thyristor has first fired.

2. A combination as in claim 1, wherein said stabilizing circuit includes a series-connected resistance and capacitance connected in parallel with said second capacitor for selectively energizing said additional thyristor.

3. A combination as in claim 1, wherein said stabilizing circuit includes a series-connected resistance and voltage reference diode connected in parallel with said second capacitor for selectively energizing said additional thyristor.

* * * * *